US012668031B2

(12) United States Patent
Lin et al.

(10) Patent No.: US 12,668,031 B2
(45) Date of Patent: Jun. 30, 2026

(54) ADDITIVE MANUFACTURING USING CONTINUOUS-FIBER REINFORCED COMPOSITES WITH GRAPHENE

(71) Applicants: Kansas State University Research Foundation, Manhattan, KS (US); University of Cincinnati, Cincinnati, OH (US)

(72) Inventors: Dong Lin, Manhattan, KS (US); Jing Shi, Cincinnati, OH (US); Pedram Parandoush, San Jose, CA (US)

(73) Assignees: UNIVERSITY OF CINCINNATI, Cincinnati, OH (US); Kansas State University Research Foundation, Manhattan, KS (US)

( * ) Notice: Subject to any disclaimer, the term of this patent is extended or adjusted under 35 U.S.C. 154(b) by 175 days.

(21) Appl. No.: 18/291,705

(22) PCT Filed: Jul. 26, 2022

(86) PCT No.: PCT/US2022/038350
§ 371 (c)(1),
(2) Date: Jan. 24, 2024

(87) PCT Pub. No.: WO2023/009524
PCT Pub. Date: Feb. 2, 2023

(65) Prior Publication Data
US 2025/0001705 A1     Jan. 2, 2025

Related U.S. Application Data

(60) Provisional application No. 63/225,618, filed on Jul. 26, 2021.

(51) Int. Cl.
B29C 70/02      (2006.01)
B29K 63/00      (2006.01)
(Continued)

(52) U.S. Cl.
CPC .............. B29C 70/025 (2013.01); B32B 5/02 (2013.01); B32B 5/26 (2013.01); B32B 7/04 (2013.01);
(Continued)

(58) Field of Classification Search
CPC ............ B29K 2507/04; B29K 2309/08; B29K 2307/04; B29K 2105/0881;
(Continued)

(56) References Cited

U.S. PATENT DOCUMENTS

2020/0061938 A1     2/2020   Lin et al.
2020/0214090 A1     7/2020   Van Tooren et al.

FOREIGN PATENT DOCUMENTS

WO          2015011549          1/2015

OTHER PUBLICATIONS

International Search Report and Written Opinion of corresponding PCT Application PCT/US2022/038350 dated Nov. 30, 2022; pp. 19.
(Continued)

*Primary Examiner* — Camie S Thompson
(74) *Attorney, Agent, or Firm* — Hovey Williams LLP

(57)          ABSTRACT

Additive manufacturing of continuous-fiber reinforced composites. More particularly, aspects of the invention relate to additive manufacturing systems and methods for fabricating 3D parts from continuous-fiber reinforced composites such as carbon-fiber or glass-fiber pre impregnated ("pre-preg") sheets. A laser-assisted laminated object manufacturing method is used to fabricate continuous carbon fiber reinforced polymer composites (CFRPCs) using prepreg sheets with continuous-carbon fiber reinforcement. Graphene functions as a modifier between the prepreg sheets to improve the mechanical properties of the CFRPCs, specifically low porosity, high concentrations of continuous carbon fibers, and improved interfacial bonding strength. This composite
(Continued)

architecture design, involving laminated continuous-carbon fiber reinforced prepreg sheets and graphene-modified interfaces, provides a readily scalable manufacturing method for producing 3D parts with desirable characteristics.

16 Claims, 13 Drawing Sheets

(51) Int. Cl.

| | |
|---|---|
| B29K 105/08 | (2006.01) |
| B29K 105/16 | (2006.01) |
| B29K 307/04 | (2006.01) |
| B29K 309/08 | (2006.01) |
| B29K 507/04 | (2006.01) |
| B32B 5/02 | (2006.01) |
| B32B 5/26 | (2006.01) |
| B32B 7/04 | (2019.01) |
| B33Y 10/00 | (2015.01) |
| B33Y 70/10 | (2020.01) |
| B33Y 80/00 | (2015.01) |
| C08J 5/24 | (2006.01) |
| C08K 3/04 | (2006.01) |

(52) U.S. Cl.

CPC .............. *B33Y 10/00* (2014.12); *B33Y 70/10* (2020.01); *B33Y 80/00* (2014.12); *C08J 5/243* (2021.05); *C08J 5/244* (2021.05); *C08J 5/249* (2021.05); *C08K 3/042* (2017.05); *B29K 2063/00* (2013.01); *B29K 2105/0881* (2013.01); *B29K 2105/16* (2013.01); *B29K 2307/04* (2013.01); *B29K 2309/08* (2013.01); *B29K 2507/04* (2013.01); *B32B 2250/20* (2013.01); *B32B 2250/44* (2013.01); *B32B 2260/023* (2013.01); *B32B 2260/046* (2013.01); *B32B 2262/101* (2013.01); *B32B 2262/106* (2013.01); *B32B 2264/108* (2013.01); *B32B 2307/54* (2013.01); *B32B 2307/542* (2013.01); *B32B 2307/546* (2013.01); *C08J 2363/00* (2013.01)

(58) Field of Classification Search

CPC ............ B29K 2063/00; B29C 66/1122; B29C 66/5326; B29C 66/71; B29C 66/7212; B29C 66/72141; B29C 66/8362; B29C 65/1654; B29C 65/8215; B29C 65/8253; B29C 64/147; B29C 70/025; B29C 70/16; C08J 5/249; C08J 5/243; C08J 5/244; B33Y 70/10; B33Y 80/00; B33Y 10/00; C08K 3/042

USPC ...................................................... 428/299.1

See application file for complete search history.

(56) References Cited

OTHER PUBLICATIONS

Parandoush et al., Laser Assisted Additive Manufacturing of Onctinuous Fiber Reinforced Thermoplastic Composites; Materials & Design, Vo. 131, Jun. 6, 2017, pp. 186-195.

Parandoush et al., Additive Manufacturing of Continuous Carbon Fiber Reinforced Epoxy Composite With Graphene Enhanced Interlayer Bond Toward Ultra-High Mechanical Properties, Polymer Composites, vol. 43, Dec. 1, 2021, pp. 934-945.

ADDITIVE MANUFACTURING USING CONTINUOUS-FIBER REINFORCED COMPOSITES WITH GRAPHENE

CROSS-REFERENCE TO RELATED APPLICATIONS

This application is the U.S. National Stage of International Patent Application No. PCT/US2022/038350, filed Jul. 26, 2022, which claims the benefit of U.S. Provisional Patent Application Ser. No. 63/225,618, filed Jul. 26, 2021, each entitled ADDITIVE MANUFACTURING USING CONTINUOUS-FIBER REINFORCED COMPOSITES WITH GRAPHENE, each of which is incorporated by reference herein in its entirety.

BACKGROUND OF THE INVENTION

Field of the Invention

The present invention relates to additive manufacturing of continuous-fiber reinforced composites. More particularly, aspects of the invention relate to additive manufacturing systems and methods for fabricating 3D parts from continuous-fiber reinforced composites such as, e.g., carbon-fiber or glass-fiber pre-impregnated sheets ("prepreg" or "sheets").

Description of Related Art

Continuous carbon fiber reinforced polymer composites (CFRPCs) are attracting increasing attention as structural materials in various applications, e.g., aerospace, construction, marine, and automotive industries, because of their superior mechanical and physical properties, including favorable stiffness-to-weight and strength-to-weight ratios, as well as resistance to corrosion. Additive manufacturing (AM) techniques, which do not require complicated molds or intensive post-machining processes, have been currently applied to fabricate CFRPC components. To date, many AM techniques have been developed, including Fused Filament Fabrication (FFF) or so-called Fused Deposition Modeling (FDM), Laminated Object Manufacturing (LOM), Liquid Deposition Modeling (LDM), and Selective Laser Sintering (SLS). FDM is one of the most popular AM techniques for CFRPCs. In the FDM process, the molten polymeric resin and dry carbon fiber is supplied separately and deposited after mixing through a printing nozzle, or the pre-impregnated continuous fiber composite is directly deposited. However, the drawbacks, such as poor interlayer bonding, high porosity, and low fiber-matrix bonding strength, significantly reduce the mechanical properties and impede the widespread applications of FDM produced composites. Laminated Object Manufacturing (LOM) is another AM technique capable of fabricating continuous carbon fibers reinforced composites by laminating 2D prepreg composite sheets. However, weak interfacial strength between the laminated layers resulting from adhesive bonding is still a significant challenge.

In the CFRPC systems, fibers are the load-bearing component, while the polymer matrix protects fibers to keep their orientation and distribute the external load. Both the properties of the constituent materials and fiber concentrations, and also the load transfer capacity from the matrix to the fibers can affect the performance of CFRPCs. The load transfer is mostly determined by the interfacial interactions between polymer matrix and fibers and is always limited due to the surface inertness of carbon fibers. This drawback can potentially lead to catastrophic failure of the whole CFRPC systems. To improve the interfacial properties, many modification methods have been developed, such as thermal treatment, plasma treatment, and mixing nanoparticles into the surface of the reinforcement.

However, recently, graphene or graphene derivative, e.g., reduced-graphene oxide (rGO), materials have been applied as a nano-filler due to their outstanding electrical, thermal, and mechanical properties. Graphene surface delocalized $\pi$-orbital functional groups can interact with some molecular structures inside resin's composition, and hence improve the adhesion. Thus, graphene is an ideal candidate for inclusion into CFRPCs.

Therefore, there is a need for a novel AM technique called laser-assisted laminated object manufacturing (LA-LOM) to produce CFRPCs using prepreg sheets with laminated continuous carbon fiber reinforcement and graphene-modified interfaces, providing a readily scalable manufacturing method toward excellent properties.

SUMMARY OF THE INVENTION

The present invention is broadly concerned with additive manufacturing systems and methods for fabricating 3D parts from continuous-fiber reinforced composites such as, e.g., carbon-fiber or glass-fiber pre-impregnated sheets ("prepreg" or "sheets").

More particularly, in some embodiments, a method for forming a three-dimensional, continuous-fiber reinforced composite part comprises: forming a laminate structure comprising a first layer of continuous-fiber reinforced sheet welded to at least one other layer of continuous-fiber reinforced sheet, wherein each of the layers of continuous-fiber reinforced sheets having two opposed faces and comprising a fiber and epoxy resin material composite, wherein the welding of the first layer of continuous-fiber reinforced sheet to the at least one other layer of continuous-fiber reinforced sheet comprises causing the epoxy resin material of a first face of the first layer of continuous-fiber reinforced sheet to heat and intermix with the epoxy resin material of a first face of each of the at least one other continuous-fiber reinforced sheets so as to form an interlayer bond between the first layer of continuous-fiber reinforced sheet and the at least one other layer of continuous-fiber reinforced sheet that occupies at least a majority of the first face of the first layer of continuous-fiber reinforced sheet thereby forming the laminate structure. In some embodiments, the fiber component of the fiber and epoxy resin material composite comprises carbon fibers, glass fibers, unidirectional fibers, and/or multi-directional fibers. In other embodiments, each of the plurality of layers of continuous-fiber reinforced sheets can be a fiber-epoxy prepreg, preferably further comprising graphene or a graphene derivative. In most preferred embodiments, the fiber-epoxy prepreg is loaded with graphene or graphene derivative.

In preferred embodiments, a method for forming a three-dimensional, continuous-fiber reinforced composite comprises: forming a laminate structure comprising a first layer of continuous-fiber reinforced sheet welded to at least one other layer of continuous-fiber reinforced sheet, wherein each of the layers of continuous-fiber reinforced sheets having two opposed faces and comprising a fiber and resin material composite and graphene or a graphene derivative, wherein the welding of the first layer of continuous-fiber reinforced sheet to the at least one other layer of continuous-fiber reinforced sheet comprises causing the resin material of a first face of the first layer of continuous-fiber reinforced sheet to heat and intermix with the resin material of a first face of each of the at least one other continuous-fiber reinforced sheets so as to form an interlayer bond between the first layer of continuous-fiber reinforced sheet and the at least one other layer of continuous-fiber reinforced sheet that occupies at least a majority of the first face of the first layer of continuous-fiber reinforced sheet thereby forming the laminate structure. In other embodiments, each of the plurality of layers of continuous-fiber reinforced sheets can be a fiber-epoxy prepreg, and the fiber-epoxy prepreg is loaded with the graphene or graphene derivative.

In other embodiments, a method for forming a three-dimensional, continuous-fiber reinforced composite part comprises: providing at least first and second continuous-fiber reinforced sheets wherein each of the continuous-fiber reinforced sheets has first and second opposed faces; placing the first sheet on top of the second sheet so that the second face of the first sheet abuts the first face of the second sheet; and applying a laser beam to the first face of the first sheet to create a weld between the second face of the first sheet first and the first face of the second sheet thereby forming a laminate structure. In some embodiments, the weld comprises an interstitial space between the second face of the first continuous-fiber reinforced sheet and the first face of the second continuous-fiber reinforced sheet, wherein the interstitial space comprises a portion of the resin material and a portion of the graphene or graphene derivative from each of the at least first and second continuous-fiber reinforced sheets.

DETAILED DESCRIPTION

The present invention is concerned with additive manufacturing systems and methods and the products created thereby. The additive manufacturing systems and methods generally use continuous-fiber reinforced composites in the form of a sheet and/or a pre-impregnated ("pre-preg") composite, collectively and individually referred to herein as "sheet" for simplicity. In preferred embodiments, the systems and methods cut a sheet using a cutting laser, load the sheet with graphene or a graphene derivative using a graphene-containing dispersion, add the sheet to another sheet, and weld the sheets together using a laser welding and rolling process. These steps are repeated a plurality of times until a completed laminate, 3D structure is formed.

Figure 1A:
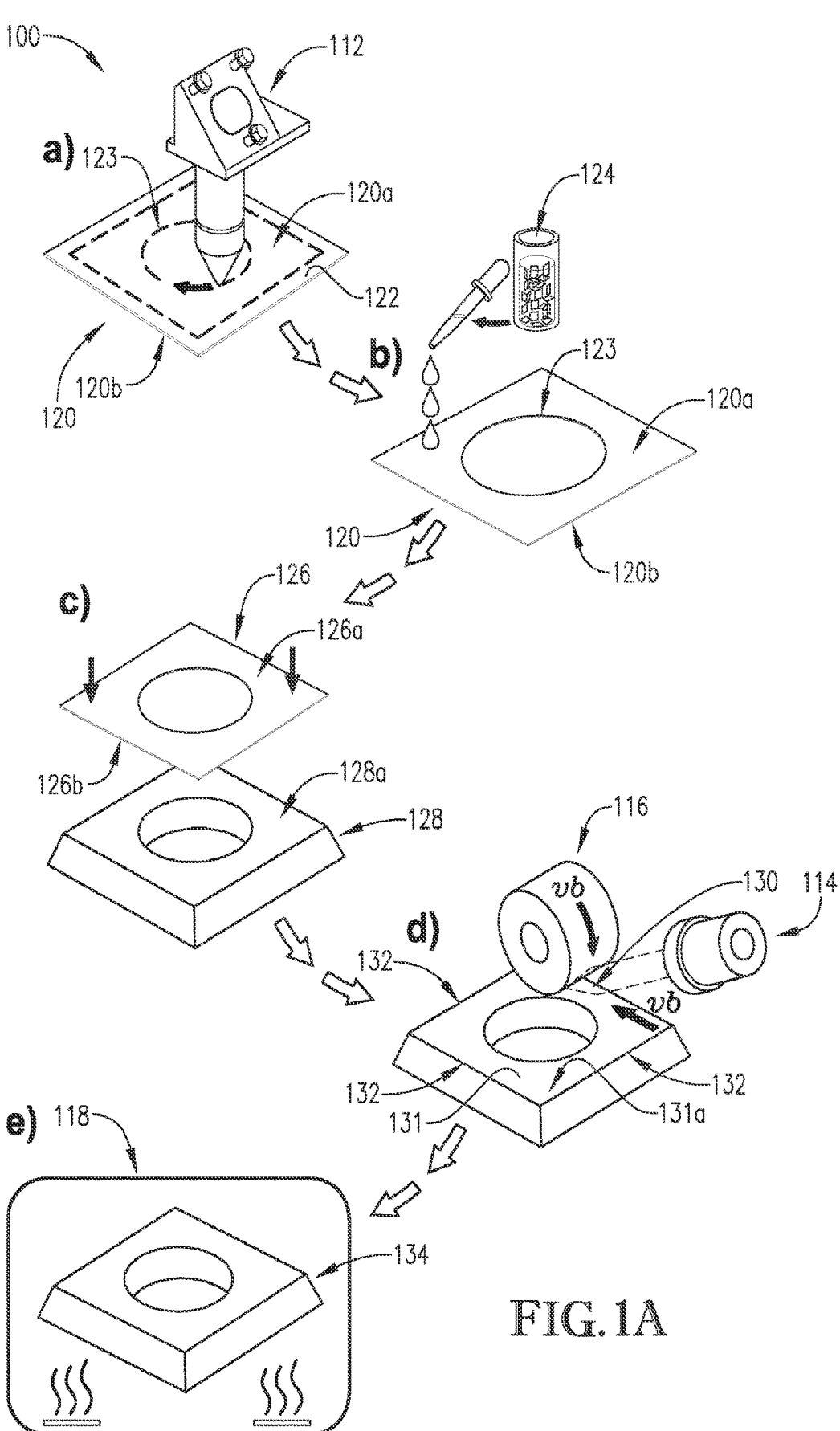
FIG. 1A is a schematic of an additive manufacturing system according to one aspect of the invention.

This may be more readily understood with reference to the figures. FIG. 1 is a schematic of an additive manufacturing system 100 and process 101 according to one aspect of the invention. Turning to FIG. 1A, the additive manufacturing system 100 generally includes a cutting laser 112, a welding laser 114, a compaction roller 116, and a furnace 118. The cutting laser 112 and the welding laser 114 may be any suitable laser used either for laser welding and/or laser cutting. The cutting laser 112 may also be used in addition to or in place of the welding laser 114, and the welding laser 114 may also be used in addition to or in place of the cutting laser 112. In some embodiments, the cutting laser 112 may be a carbon dioxide ($CO_2$) laser, more specifically a 90W $CO_2$ laser commercially available from Full Spectrum P-Series, Las Vegas, NV. In some embodiments, the welding laser 114 may be a $CO_2$ laser, more specifically a 100 W $CO_2$ laser commercially available from Beijing Reci Laser Technology Co., Ltd.

One or more components of the additive manufacturing system 100 may be movable to assist with certain steps of the manufacturing process, discussed in more detail below. For example, in some embodiments, a work surface supporting the layers of sheet is movable while the cutting laser 112 and welding laser 114 are fixed in place. In other embodiments, the cutting laser 112 and welding laser 114 are movable while the work surface supporting the layers of sheet remains stationary. Moreover, the compaction roller 116 may be rotatable in a direction depicted by the arrow $v_b$ in FIG. 1A to apply a constant pressure to the sheet 131 being laid during the current iterative step of the manufacturing process. That is, the compaction roller 116 rolls at a predetermined velocity, $v_b$.

The additive manufacturing system 100 generally forms a 3D laminate structure 134 layer-by-layer. In some embodiments, the layer of sheet 120 may be formed out of one sheet. In other embodiments, two or more sheets may be bonded together to form a structure, which is then bonded to another multilayered structure 128 to form a 3D laminate structure 134. The layer of sheet 120 may be any suitable continuous-fiber reinforced composite or pre-preg, more preferably, may generally include a fiber and resin material composite. In preferred embodiments, the layer of sheet 120 may be cut into a desired 2D shape 122 during a laser cutting step. In preferred embodiments, during a graphene-loading step, a graphene-loaded layer of sheet 126 may be formed by applying a graphene-containing dispersion 124 to the layer of sheet 120. The graphene-loaded layer of sheet 126 also generally includes two opposed faces 126a and 126b. During a sheet placement step, the second face 126b of the graphene-loaded layer of sheet 126 may be laid directly on a first face 128a of an at least one other layer of sheet 128 and may be laser welded to each other during a partial laser consolidation step. Although not shown in FIG. 1A, it will be appreciated that the sheet placement step may also be performed using the layer of sheet 120, which includes two opposed faces 120a and 120b. That is, during the sheet placement step, the second face 120b of the layer of sheet 120 may be laid directly on the first face 128a of the at least one other layer of sheet 128 and may be laser welded to each other during the partial laser consolidation step. The described steps may be repeated until the desired 3D laminate structure 134 is achieved. Once the desired 3D laminate structure 134 is achieved, the laminate structure 134 may be heated to cure the resin material during the post consolidation step.

It will be appreciated that one or more preparation steps may be performed prior to the sheet placement step and the partial laser consolidation step. For example, in some embodiments, a laser cutting step may be performed on the layer of sheet 120 or a graphene-loaded layer of sheet 126 using the cutting laser 112. The cutting laser 112 may be a carbon dioxide ($CO_2$) laser, more specifically a 90 W $CO_2$ laser commercially available from Full Spectrum P-Series, Las Vegas, NV. It is appreciated that "90 W" refers to the maximum power of the laser, and not necessarily a power used during the processes described herein. For example, during use, the cutting laser 112 may be operated between about 80 W and about 100 W, and, in some embodiments, may be operated at about 85 W, about 88 W, about 90 W, or about 95 W. In some embodiments, the cutting laser 112 may cut the layer of sheet 120 into a desired 2D shape 122, and in preferred embodiments, may also cut another desired 2D shape 123 inside of the layer of sheet 120. In some embodiments, the cutting speed of the cutting laser 112 is about 35 mm s$^{-1}$ to about 65 mm s$^{-1}$, preferably 45 mm s$^{-1}$ to about 55 mm s$^{-1}$, more preferably about 50 mm s$^{-1}$. Although in FIG. 1A the layer of sheet 120 is depicted as being cut into two desired 2D shapes, the invention is not so limited.

The layer of sheet 120 may be any suitable continuous-fiber reinforced composite or pre-preg, more preferably, may generally include a fiber and resin material composite. For example, in some embodiments, each layer of sheet 120 may include glass or carbon fibers suspended in a resin such as thermoplastic (e.g., polypropylene, polyethylene, or poly-ethylene terephthalate (PET)) or epoxy resin (e.g., pure epoxy resins, polyester epoxy resins, semi-toughened epoxy resin, or epoxy acrylate resins), in more preferred embodiments, suspended in epoxy resin. In more preferred embodiments, each layer of sheet 120 comprises 250° F. epoxy resin prepreg sheets having 63% carbon fiber and commercially available from Rock West Composites Corp. under the name 12029-D. In some embodiments, the fiber component in the fiber and resin material composite further comprises unidi-rectional and/or multi-directional fibers. Moreover, the layer of sheet 120 may have a thickness of about 0.01 mm to about 1.0 mm, preferably about 0.1 mm to about 0.5 mm, and more preferably about 0.125 mm to about 0.25 mm.

Moreover, it also will be appreciated that, in some embodiments, prior to the sheet placement step and the partial laser consolidation step, a graphene-loading step may also be performed on the layer of sheet 120 using a gra-phene-containing dispersion 124. The graphene-containing dispersion 124 comprises a plurality of particles of graphene or a graphene derivative dispersed within a liquid medium. The term "graphene derivative" is used herein to refer to functionalized, especially oxidized, forms of graphene, e.g., reduced-graphene oxide or graphene oxide. The liquid medium can comprise water, an alcohol (e.g., ethanol and isopropanol), or any combination thereof. In preferred embodiments, the liquid medium comprises water. The concentration of graphene or graphene derivative in the dispersion 124 is about 0.01 to about 10 mg/ml, preferably about 0.1 to about 7.5 mg/ml, and more preferably about 0.5 to about 5 mg/ml. The graphene-containing dispersion 124 can be applied to the layer of sheet 120 in any manner known in the art, e.g., spraying, immersing, dipping. For example, in some embodiments, the graphene-containing dispersion 124 may be poured onto one of the faces 120a or 120b of the layer of sheet 120 to cover at least a majority of one of the faces 120a or 120b of the layer of sheet 120, and more preferably at least the entire surface of one of the faces 120a or 120b of the layer of sheet 120. In the depicted embodi-ment, the graphene-containing dispersion 124 is poured onto the first face 120a of the layer sheet 120. It should be understood that the amount of graphene or graphene deriva-tive loading is critical to avoid agglomeration of the plurality of particles of graphene or a graphene derivative as too much graphene may degrade the mechanical properties of the laminate structure 134. After the graphene-containing dis-persion 124 is applied to the layer of sheet 120, the plurality of particles of graphene or a graphene derivative attach and/or adhere to the layer of sheet 120 so as to form the graphene-loaded layer of sheet 126. In more preferred embodiments, the graphene-loaded layer of sheet 126 may be dried prior to the sheet placement step to ensure that a substantial amount of the plurality of particles of graphene or a graphene derivative attach and/or adhere to the sheet 126.

During the sheet placement step, in some embodiments, one of the faces 120a or 120b of the layer of sheet 120 and/or one of the faces 126a or 126b of the graphene-loaded sheet 126 may be laid in any desired orientation to abut a face 128a of at least one other layer of sheet 128. For example, the second face 120b of the layer of sheet 120 or the second face 126b of the graphene-loaded layer of sheet 126 may be in contact with at least part of, preferably at least a majority of, more preferably at least the entire surface of, the first face 128a of the at least one other layer of sheet 128. In the depicted embodiment, the second face 126b of the graphene-loaded layer of sheet 126 is laid directly on the first face 128a of the at least one other layer of sheet 128. Although not shown in FIG. 1A, it will be appreciated that the second face 120b of the layer of sheet 120 may also be placed on the first face 128a of the at least one other layer of sheet 128 during the sheet placement step.

After the layer of sheet 120 or the graphene-loaded layer of sheet 126 is laid, the partial laser consolidation step may be performed. As depicted in FIG. 1A, a welding laser 114 is directed to a welding interface 130. More particularly, the welding laser 114 causes the plurality of particles of gra-phene or a graphene derivative on the graphene-loaded layer of sheet 126 to impregnate the sheet 126 so as form an impregnated layer of sheet 131. The term "impregnate" is used herein to mean that at least a substantial portion of the plurality of particles of graphene or a graphene derivative penetrate the graphene-loaded layer of sheet 126 so as to migrate beneath the first face 126a of the graphene-loaded layer of sheet 126 and to remain within the first and second faces 126a and 126b of the graphene-loaded layer of sheet 126. That is, at least a majority of the plurality of particles of graphene or a graphene derivative do not agglomerate on the surface of the graphene-loaded layer of sheet 126. Simultaneously, the welding laser 114 also causes the resin material of the second face of the impregnated layer of sheet 131 to melt and intermix with the resin material of the first face 128a of the at least one other layer of sheet 128 so as to form a bond and/or weld 132 between the impregnated layer of sheet 131 and the at least one other layer of sheet 128 that occupies at least a majority of the second face of the impregnated layer of sheet 131. In other embodiments, a portion of the fiber in the second face of the impregnated layer of sheet 131 may melt and intermix with the resin material of the first face 128a of the at least one other layer of sheet 128. The term "intermix" is used herein to refer to the migration of the resin material from the face of the impregnated layer of sheet 131 to the face of the at least one other layer of sheet 128. Moreover, the weld 132 comprises an interstitial space between the second face of the impregnated layer of sheet 131 and the first face 128a of the at least one other layer of sheet 128. The interstitial space comprises the resin material from both layers of sheet 128 and 131. In some embodiments, the interstitial space of some embodiments further comprises the fiber material and/or the plurality of particles of graphene or a graphene derivative from both layers of sheet 128 and 131. More particularly, a portion of the fiber material and/or at least a majority of the plurality of particles of graphene or a graphene derivative migrate into the bond and/or weld 132 between the layers 128 and 131. It will be appreciated that the at least a majority of the plurality of particles of graphene or a graphene derivative function as reinforcing fillers to modify the interfacial interactions taking place within the interstitial space of the bond and/or weld 132. In other embodiments, the partial laser consolidation step is performed as previously described on the layer of sheet 120.

During partial laser consolidation step, the welding interface 130 generally moves in a direction depicted by arrow accompanying $v_b$ as the majority of the impregnated layer of sheet 131 or the layer of sheet 120 is welded to the at least one other layer of sheet 128. In other embodiments, a workspace supporting the at least one other layer of sheet 128 may be movable in addition to or instead of the welding laser 114. The welding laser 114 may impinge upon the welding interface 130 at an angle of 0 to 90 degrees with respect to the impregnated layer of sheet 131 or layer of sheet 120, and more particularly 10 to 30 degrees, and in some embodiments 20 degrees. In some embodiments, the welding laser 114 may be a $CO_2$ laser, more specifically a 100 W $CO_2$ laser commercially available from Beijing Reci Laser Technology Co., Ltd. It is appreciated that "100 W" refers to the maximum power of the laser, and not necessarily a power used during the processes described herein. For example, during use, the welding laser 114 may be operated between about 20 W and about 35 W and, in some embodiments, may be operated at about 25 W, about 27 W, about 28 W, or about 29 W.

Again, by directing the laser 114 at the welding interface 130, the layers of sheet 120 or impregnated layers of sheet 131 are heated and welded together with the at least one other layer of sheet 128. For example, in some embodiments, focusing the laser 114 at the welding interface 130 may cause the resin material in the sheets to heat, melt, and intermix, forming a bond and/or weld 132 between the layer of sheet 120 or the impregnated layer of sheet 131 and the at least one other layer of sheet 128. Moreover, pressure is applied to the layer of sheet 120 or impregnated layer of sheet 131 and the at least one other layer of sheet 128 via the compaction roller 116 at a predetermined velocity, $v_b$. The pressure applied by the compaction roller 116 further assists with the migration of the plurality of particles of graphene or a graphene derivative between the first and second faces of the impregnated sheet 131 and assists with the curing process of the resin contained in the sheets, e.g., continuous-fiber reinforced composites or a pre-preg composites. In some embodiments, the welding laser 114 welds and heats the entire surface of the first face 131a of the impregnated layer of sheet 131 followed by an application of pressure by the compaction roller 116 to the first face 131a of the impregnated layer of sheet 131. In other embodiments, the entire surface of the first face 131a of the impregnated layer of sheet 131 is heated and welded by the welding laser 114 and simultaneously compacted by the compaction roller 116.

Although not shown, in other embodiments, the sheets may be bonded to one another using other methods. For example, the sheets may be bonded during the partial laser consolidation step by ultrasonic welding.

The above described sheet placement and partial laser consolidation steps may be repeated until the desired 3D laminate structure 134 is achieved. That is, the next layer of sheet 120 or graphene-loaded layer of sheet 126 is laid next to a previously laid layer of sheet 128 (if any) and is welded to the already laid layer of sheet 128 using laser welding from the welding laser 114 and pressure from the compaction roller 116. In preferred embodiments, the laser cutting step and the graphene-loading step may be repeated in addition to the sheet placement step and the partial laser consolidation step. Moreover, although the steps depicted in FIG. 1A are performed in a specific order, in other embodiments these and other steps of the methods described herein may be performed in a different order. That is, many different arrangements of the various components depicted, as well as components not shown, are possible without departing from the spirit and scope of the present invention.

Once the desired 3D laminate structure 134 is achieved, the 3D laminate structure 134 is heated to cure the resin material within the structure during the post consolidation step, thereby forming a resulting 3D part. The 3D laminate structure 134 can be heated in any manner known in the art, e.g., ceramic heater, oven, furnace, and the like. In preferred embodiments, the post-consolidation step is performed at about 100° C. to about 200° C., preferably 125° C. to 175° C., more preferably at about 150° C. for about 1 to about 1000 minutes, preferably about 50 minutes to about 200 minutes. In the depicted embodiment, the 3D laminate structure 134 is heated for about 90 minutes in a furnace 118 for about 150° C.

Figure 1B:
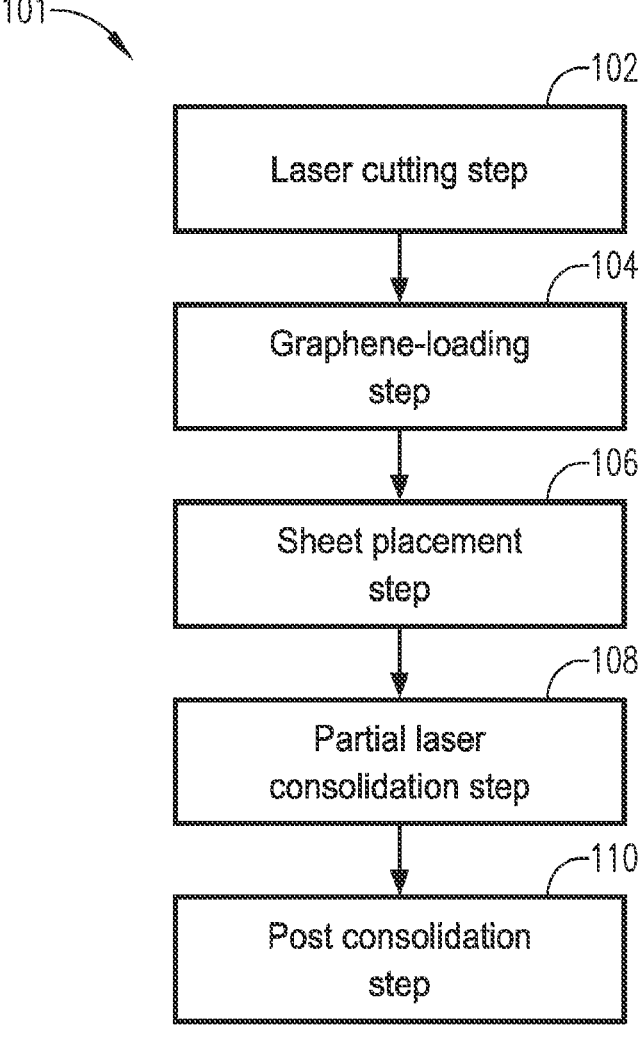
FIG. 1B is a schematic of an additive manufacturing process according to one aspect of the invention.

Now turning to FIG. 1B, the additive manufacturing process 101 generally includes a laser cutting step 102, a graphene-loading step 104, a sheet placement step 106, a partial laser consolidation step 108, and a post consolidation step 110. Specifically, in preferred embodiments, during the laser cutting step 102, a layer of sheet or an impregnated layer of sheet may be cut into one or more desired 2D shapes. During the graphene-loading step 104, a graphene-loaded layer of sheet, which includes two opposed faces, may be formed by applying a graphene-containing dispersion to the layer of sheet. During the sheet placement step 106, the second face of the impregnated layer of sheet or, in some embodiments, the second face of the layer of sheet may be laid directly on a first face of an at least one other layer of sheet and may be laser welded to each other during the partial laser consolidation step 108. The described steps may be repeated until the desired 3D laminate structure 134 is achieved. In preferred embodiments, one or more preparation steps, e.g., laser cutting step 102 and/or graphene-loading step 104, may be completed prior to the sheet placement step 106 and the partial laser consolidation step 108. In other embodiments, the sheet placement step 106, the partial laser consolidation step 108 may be the only steps performed before the post consolidation step 110. In other embodiments, the additive manufacturing process 101 may be performed using more than one type of sheet. For example, the laser cutting step 102, the sheet placement step 106 and/or partial laser consolidation step 108 may be first performed using a layer of sheet and then performed using an impregnated layer of sheet. Once the desired 3D laminate structure 134 is achieved, the laminate structure 134 may be heated to cure the resin material during the post consolidation step 110. Moreover, although the steps depicted in FIG. 1B are performed in a specific order, in other embodiments these and other steps of the methods described herein may be performed in a different order.

Figure 2:
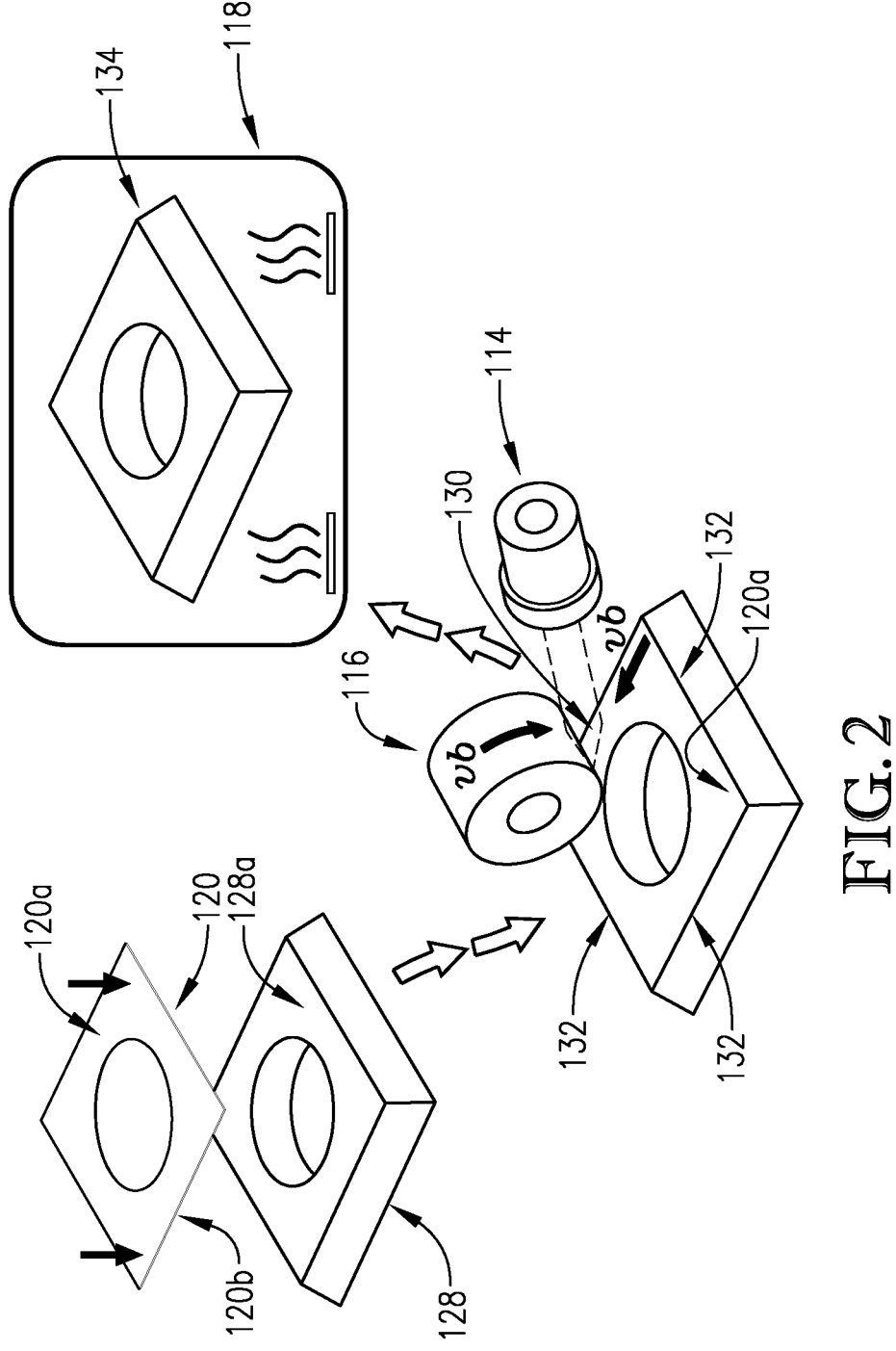
FIG. 2 is a schematic of an additive manufacturing system according to another aspect of the invention wherein graphene impregnation is optional.

It will be appreciated that the sheet placement step may also be performed using the layer of sheet. That is, a laminate structure may be fabricated using layers of sheet not impregnated with graphene or a graphene derivative. This may be more readily understood with reference to FIG. 2. FIG. 2 shows a schematic of an additive manufacturing system 100 according to one aspect of the invention. More particularly, this system is the same as the above-described system shown in FIG. 1A with the only difference being that graphene impregnation is optional. For example, in the depicted embodiment, the sheet placement step is performed using the layer of sheet 120, which includes two opposed faces 120a and 120b. The second face 120b of the layer of sheet 120, which is not impregnated with graphene or a graphene derivative, may be laid directly on the first face 128a of the at least one other layer of sheet 128 and may be laser welded to each other during the partial laser consolidation step. Moreover, although the steps depicted in FIG. 2 are performed in a specific order, in other embodiments these and other steps of the methods described herein may be performed in a different order.

The resulting 3D part fabricated by the above-described additive manufacturing system and process have a high concentration of continuous fibers, improved interfacial mechanical properties by graphene inclusion (if added), improved interlaminar bonding, increased strength, and lower porosity compared to, e.g., 3D parts constructed using common AM processes. More particularly, the resulting 3D part may have a tensile strength of about 1150 MPa to about 3800 MPa, preferably about 1200 MPa to about 3200 MPa, and a tensile modulus of about 30 GPa to about 320 GPa, preferably about 50 GPa to about 200 GPa. The result 3D part may have a lap shear strength of about 10 MPa to about 30 MPa, preferably about 13 MPa to about 22 MPa, and a porosity of about 0.15% to about 0.55%, preferably about 0.25% to about 0.45%. The result 3D part may also have a flexural strength of about 800 MPa to about 1500 MPa, preferably about 900 MPa to about 1400 MPa, and a flexural modulus of about 60 GPa to about 170 GPa, preferably about 75 GPa to about 155 GPa. Thus, the above-described additive manufacturing system and process are uniquely suited to provide high-precision customized continuous-fiber reinforced composite parts.

Additional advantages of the various embodiments of the invention will be apparent to those skilled in the art upon review of the disclosure herein and the working examples below. It will be appreciated that the various embodiments described herein are not necessarily mutually exclusive unless otherwise indicated herein. For example, a feature described or depicted in one embodiment may also be included in other embodiments, but is not necessarily included. Thus, the present invention encompasses a variety of combinations and/or integrations of the specific embodiments described herein.

As used herein, the phrase "and/or," when used in a list of two or more items, means that any one of the listed items can be employed by itself or any combination of two or more of the listed items can be employed. For example, if a composition is described as containing or excluding components A, B, and/or C, the composition can contain or exclude A alone; B alone; C alone; A and B in combination; A and C in combination; B and C in combination; or A, B, and C in combination.

The present description also uses numerical ranges to quantify certain parameters relating to various embodiments of the invention. It should be understood that when numerical ranges are provided, such ranges are to be construed as providing literal support for claim limitations that only recite the lower value of the range as well as claim limitations that only recite the upper value of the range. For example, a disclosed numerical range of about 10 to about 100 provides literal support for a claim reciting "greater than about 10" (with no upper bounds) and a claim reciting "less than about 100" (with no lower bounds).

EXAMPLES

The following examples set forth methods in accordance with the invention. It is to be understood, however, that these examples are provided by way of illustration and nothing therein should be taken as a limitation upon the overall scope of the invention.

Example 1

Materials

The CFRPC prepreg sheets used are 12029-D prepreg sheets (Rock West Composites Corp., West Jordan, UT) with 63 wt. % T800S carbon fibers and 250F epoxy resin. The layer thickness of prepreg is 152 μm. Aqueous graphene solution with concentration varying from 0.5 to 3.0 mg/ml is used as reinforcing fillers to obtain the modification of interfacial interactions of printed prepreg sheets. The graphene is prepared via a controlled detonation of acetylene and oxygen with a molar ratio of $O_2/C_2H_2=0.3$. The graphene powder has a mass density of ca. 70 mg/cc and a BET determined specific surface area of ca. 160 $m^2$/g. Raman spectroscopy, XRD and TEM indicate few layer graphene sheets. The microscopic morphology is that of compressed fractal aggregates with platelets (flakes) of graphene 20 nm to 300 nm in extent. The method is described in A. Nepal, G. P. Singh, B. N. Flanders, C. M. Sorensen, One-step synthesis of graphene via catalyst-free gas-phase hydrocarbon detonation, Nanotechnology. 24 (2013).

Laser-Assisted Laminated Object Manufacturing

Firstly, the desired 3D parts are "sliced" into multiple 2D layers, and each layer is cut by a $CO_2$ laser cutter (Full Spectrum P-Series, Las Vegas, NV). The applied power and cutting speed of the laser are 90 W and 50 mm $s^{-1}$, respectively. Then, each layer is impregnated with the aqueous graphene suspension and the graphene impregnated prepreg sheets are bonded layer-by-layer using the synergistic effect of consolidation from a roller and heating from another $CO_2$ laser. The laser is emitted at the top of the stacked prepreg sheets with an angle of ~20°, followed immediately by rolling compaction. The laser used in this process is $CO_2$ laser (Beijing Reci Laser Technology, China) with the applied power of 29 W, and the prepreg sheets move with the speed of 6 mm $s^{-1}$ and scan spacing of 3 mm under the roller. These procedures (i.e., impregnating, bonding, lasering and rolling) are repeated until a desired laminate structure is achieved. Finally, the post-consolidation is performed at 150° C. for 90 min in a furnace.

The tensile test is performed using a universal testing machine (Shimadzu AG-IC, Japan) with the testing speed of 2 mm min$^{-1}$. During the tensile tests, the strain is measured through an extensometer (Model 3542, Epsilon Technology Corp, USA). The lap shear test and flexural test are performed using a universal testing machine (Shimadzu EZ-LX, Japan) with the testing speed of 1.3 mm s$^{-1}$ and 1 mm s$^{-1}$, respectively. The tensile test, lap shear test, and flexural test are conducted based on ASTM D3039, ASTM D5868, and ASTM D7264, respectively. All measurements are carried out five times to obtain the average tested values of each sample. The typical tensile fracture surfaces of the samples are observed by a scanning electron microscope (FEI Versa 3D Dual Beam, OR). The cross-sectional micro-CT images are obtained by a Zeiss Versa 620 Scanner, and the porosity is calculated based on the micro-CT images.

Figure 3:
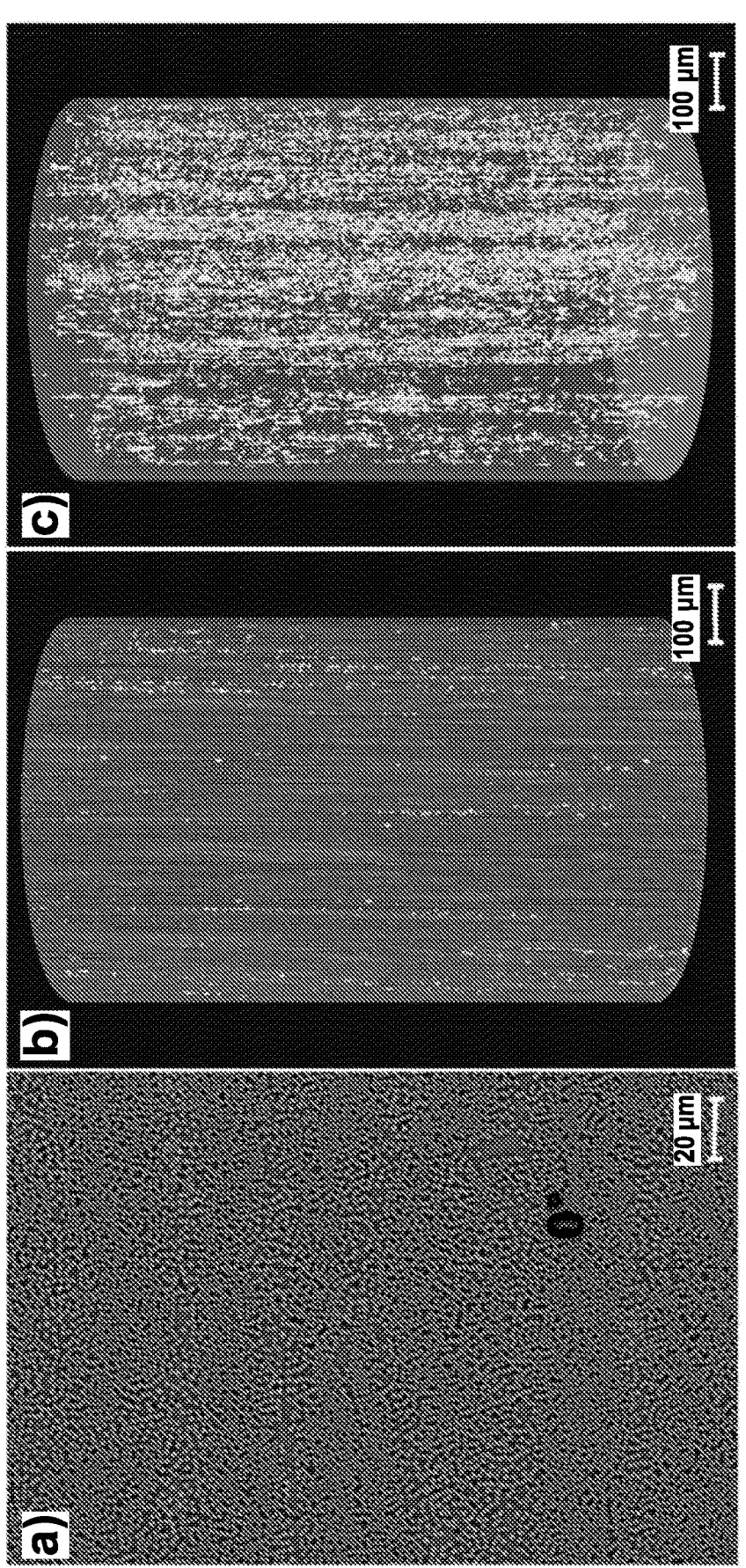
FIG. 3 depicts X-ray micro-computed tomography (micro-CT) scanned images (a)-(c) of a cross-section of a 3D part without graphene fabricated using the system and process depicted in FIGS. 1 and 2.

These tests may be more readily understood with reference to FIGS. 3-8. First, FIG. 3 shows X-ray micro-computed tomography (micro-CT) scanned images of a cross-section of a 3D part fabricated using the above described system and/or process. More particularly, FIG. 3(a) shows micro-CT scanned images of a cross-section of a 3D part fabricated using unidirectional ([0°]$_2$ fiber arrangements) continuous carbon pre-preg fibers such as, e.g., 12029-D commercially available from Rock West Composites Corp., West Jordan, UT. As best seen in FIG. 3(a), the sheets were laid at a substantially 0 degree angle with respect to the abutting layers. More particularly, the fibers generally are arranged in a direction extending into/out of the image. Although some micro-pores are formed, the fibers in each layer are continuous as no visible layer structure can be observed in the bonded 3D part. With a total porosity of 0.38%, the 3D part shows a lower porosity than those fabricated by the FDM method. FIGS. 3(b) and 3(c) show 3D computed tomography (CT) scanned images of the 3D part shown in FIG. 3(a). In these figures, the fibers are rendered in dark gray, and the pores are rendered in light gray (almost white). Most pores have a narrow-long shape and are distributed along the continuous fibers. Because carbon fibers are much stronger and stiffer than matrix materials, these properties render it difficult to remove the pores around the fibers. Also, the displacement of fibers caused by the vibration during laser cutting or consolidation may result in pores. More particularly, FIG. 3(b) shows continuous fiber reinforcement in the 3D part, resulting in superior stiffness compared to other additive manufacturing methods.

Figure 4:
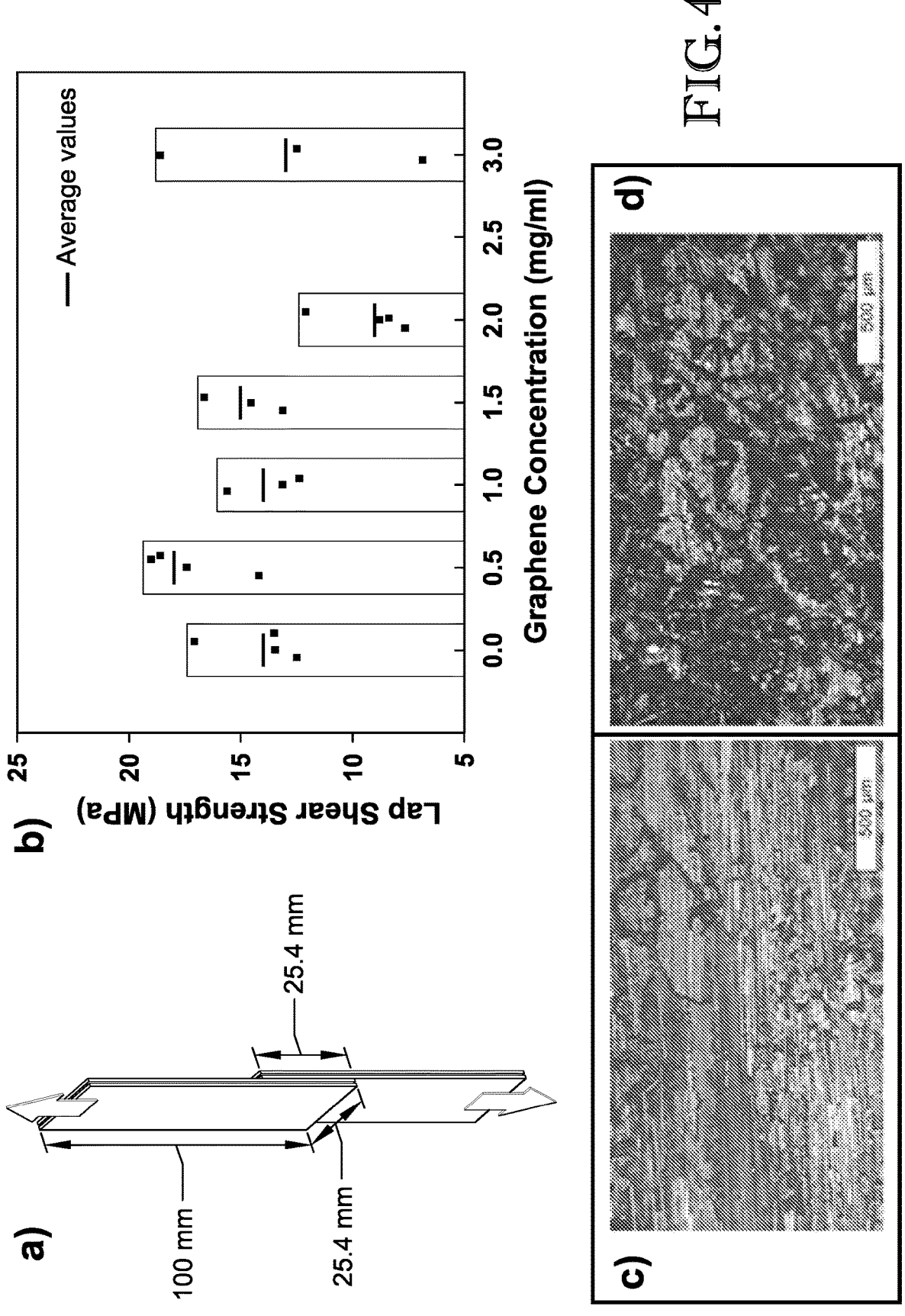
FIG. 4 depicts (a) the dimensions of the 3D parts with and without graphene fabricated using the system and process depicted in FIGS. 1 and 2; (b) a bar graph of the lap shear strength the 3D parts with and without graphene fabricated using the system and process depicted in FIGS. 1 and 2; (c) an overlap surface morphology image of the 3D parts without graphene fabricated using the system and process depicted in FIGS. 1 and 2; and (d) an overlap surface morphology image of the 3D parts impregnated with 0.5 mg/ml of graphene fabricated using the system and process depicted in FIGS. 1 and 2.

FIG. 4 shows the interlaminar bonding strength of 3D parts fabricated using the above described system and/or process. More particularly, FIG. 4 shows the interlaminar bonding strength 3D parts fabricated using continuous carbon pre-preg fibers, such as, e.g., 12029-D commercially available from Rock West Composites Corp., West Jordan, UT and 3D parts fabricated using continuous carbon pre-preg fibers impregnated with various concentrations of graphene, specifically, 0.5 mg/ml (mg graphene in ml of water), 1 mg/ml, 1.5 mg/ml, 2.0 mg/ml, and 3.0 mg/ml.

FIG. 4(a) shows the dimensions of the 3D parts. FIG. 4(b) shows a bar graph of the lap shear strength (LSS) of the 3D parts depending on the graphene content. To test LSS, a lap shear test based on ASTM D5868 standard was used. As seen in FIG. 4(b), the 3D parts without graphene show an average value LSS (depicted by purple line) of 14 MPa. However, when 0.5 mg/ml of graphene is added to the 3D parts, a maximum LSS of ~18 MPa is obtained, which is 25% higher than the LSS of 3D parts without graphene. When the graphene content is higher than 1.5 mg/ml, the LSS may decrease, possibly, due to graphene agglomeration at the interlayer of the prepreg sheets. FIG. 4(c) shows an overlap surface morphology image of the 3D parts without graphene, and FIG. 4(d) shows an overlap surface morphology image of the 3D parts impregnated with 0.5 mg/ml of graphene after tensile tests. As shown in FIG. 4(c), because of the relative weak interlaminar shear strength, the samples without graphene feature the exposed fibers and epoxy residue. For the 3D parts impregnated with 0.5 mg/ml of graphene in FIG. 4(d), only a few fibers are exposed, meaning that graphene could help carbon fiber fusion between layers.

FIG. 5 shows the tensile properties of the 3D parts fabricated using the above-described system and/or process. More particularly, FIG. 5 shows the tensile properties and behaviors of 3D parts fabricated using unidirectional ([0°]$_s$ fiber arrangements) and multi-directional ([0°/−45°/+45°]$_s$ fiber arrangements) continuous carbon pre-preg fibers, such as, e.g., 12029-D commercially available from Rock West Composites Corp., West Jordan, UT, and 3D parts (dimensions: 170 mm long, 15 mm wide, and 1.3 mm thick) fabricated using unidirectional and multi-directional continuous carbon pre-preg fibers impregnated with graphene.

Figure 5A:
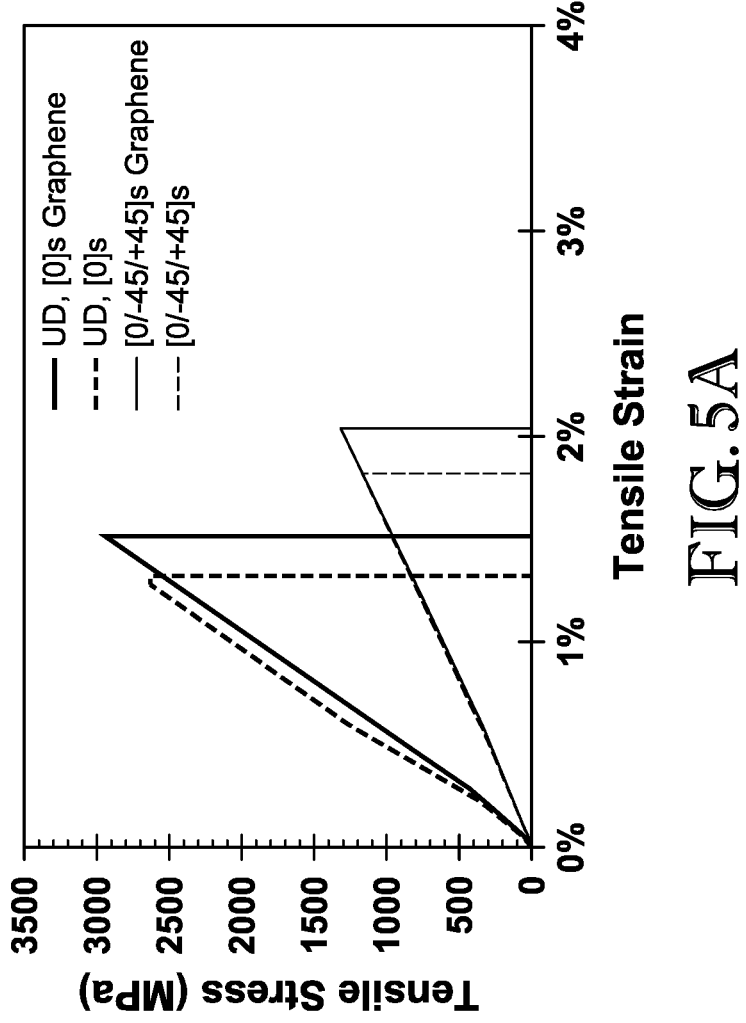
FIGS. 5A-5C depict—the tensile properties of the 3D parts with and without graphene fabricated using the system and process depicted in FIGS. 1 and 2.

FIG. 5(a) shows the representative tensile stress-strain curves of the unidirectional and multi-directional 3D parts. The multi-directional 3D parts have an average tensile strength of 1260 MPa and tensile modulus of 60 GPa, and the unidirectional 3D parts have higher values with the average tensile strength of 2760 MPa and tensile modulus of 160 GPa, respectively. The 3D parts demonstrate superior tensile strength and stiffness along the fiber direction rather than the transverse direction, while the multi-direction fiber arrangements can be used to obtain high strength in several directions. After graphene enhancement, the unidirectional 3D parts have a tensile strength of 2940 MPa and a tensile modulus of 170 GPa, which is 7% and 6% higher, respectively than that of the unidirectional 3D parts without graphene. Table 1 also shows the average tensile strength, modulus, and standard deviation of the unidirectional and multi-directional 3D parts with or without graphene.

TABLE 1

Average tensile strength, modulus, and standard deviation of the unidirectional and multi-directional LA-LOM-printed 3D parts with or without graphene.

| Samples | Tensile Strength (MPa) | Standard Deviation (MPa) | Tensile Modulus (GPa) | Standard Deviation (GPa) |
|---|---|---|---|---|
| [0°]s without graphene | 2760 | 180 | 160 | 10 |
| [0°]s with graphene | 2940 | 60 | 170 | 30 |
| [0°/45°/0°/−45°]s without graphene | 1260 | 80 | 60 | 3 |
| [0°/45°/0°/−45°]s with graphene | 1320 | 70 | 80 | 20 |

Figure 5B:
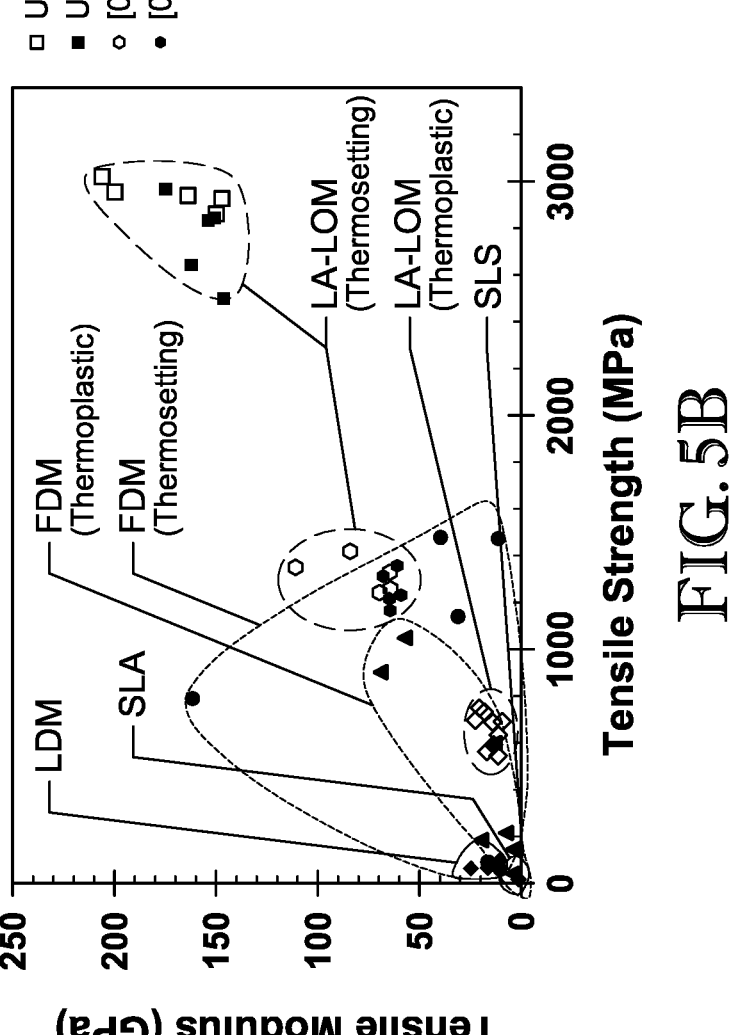

FIG. 5(b) shows a tensile property map of the 3D parts fabricated by the above described methods as compared to the carbon fiber composites fabricated by other AM methods. The tensile property data are summarized in Table 2.

TABLE 2

Mechanical properties of the LA-LOM-printed 3D parts and comparative with properties obtained by other methods.

| Materials | Fiber content | Fiber arrangement | Fabricating method | Porosity (%) | Interlaminar shear strength (MPa) | Tensile strength (MPa) | Flexural strength (MPa) |
|---|---|---|---|---|---|---|---|
| CCF/EP (this work) | 63 wt. % | 0° | LA-LOM | 0.38 | 18 | 2940 | 1310 |
| CCF/EP (this work) | 63 wt. % | 0°/45°/−45° | LA-LOM | | | 1320 | 1020 |
| CCF/ABS | 10 wt. % | 0° | FDM | | 3 | 147 | 127 |
| CCF/PA | 16 vol. % | 0° | FDM | | 18 | | 544 |
| CCF/PA | 31 vol. % | 0° | FDM | 7.5 | 34 | 905 | 426 |
| CCF/PLA | 41 vol. % | 0° | FDM | 10 | | 600 | 430 |
| CCF/PA | 35 vol. % | 0° | FDM + CM | 5.9 | | 940 | 1052 |
| CCF/PA/EP | 31 vol. % | 0° | SLS + Infiltration | 4.93 | | 101 | 153 |
| CCF/EP | | 0° | FDM | | | 793 | 202 |
| CCF/EP | 48 wt. % | 0° | FDM | 2.53 | 49 | 1476 | 858 |
| CCF/EP | 58 wt. % | 0° | FDM | 2.84 | | | 953 |
| CCF/EP | 66 wt. % | 0° | AFP + FDM | | | 1483 | |
| SCF/EP | 14 wt. % | 0° | FDM | | | 66 | |
| SCF/SiC/EP | 10 wt. % | 0° | FDM | | | 97 | |
| | | 90° | | | | 70 | |

Abbreviations: CCF—continuous carbon fiber; SCF—short carbon fiber; ABS—acrylonitrile-butadiene-styrene; PA—polyamide; PLA—polylactide; EP—epoxy; FDM—fused deposition modeling; AFP—automated fibre placement; CM—compression moulding.

As shown in FIG. 5(b), the tensile strength and modulus of the 3D parts are significantly superior to carbon fiber composites fabricated by other AM methods. With respect to the multi-directional 3D parts, the tensile strength significantly exceeds other AM methods, and the tensile modulus are comparable with those of carbon fiber composites fabricated by the FDM method. With respect to the unidirectional 3D parts, the tensile properties (including both strength and modulus) are vastly superior to those of carbon fiber composites fabricated by LDM, SLS, SLA, and FDM methods. Specifically, the tensile strength of the unidirectional 3D parts are about 30 times higher than those of carbon fiber composites fabricated by LDM, SLA, and FDM (thermosetting, SCF) and are about two to three times higher than FDM (thermosetting, CCF), FDM (thermoplastic, CCF) and LA-LOM samples (thermoplastic, CCF). Moreover, structures with multi-direction fiber arrangements could be obtained to support multidirectional loads. As shown in FIG. 5(b), the continuous carbon fiber reinforced thermosetting composites show better tensile property compared to the thermoplastic composites, due to their strong intermolecular cross-linking.

Figure 5C:
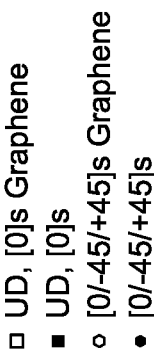
Figure 5C:
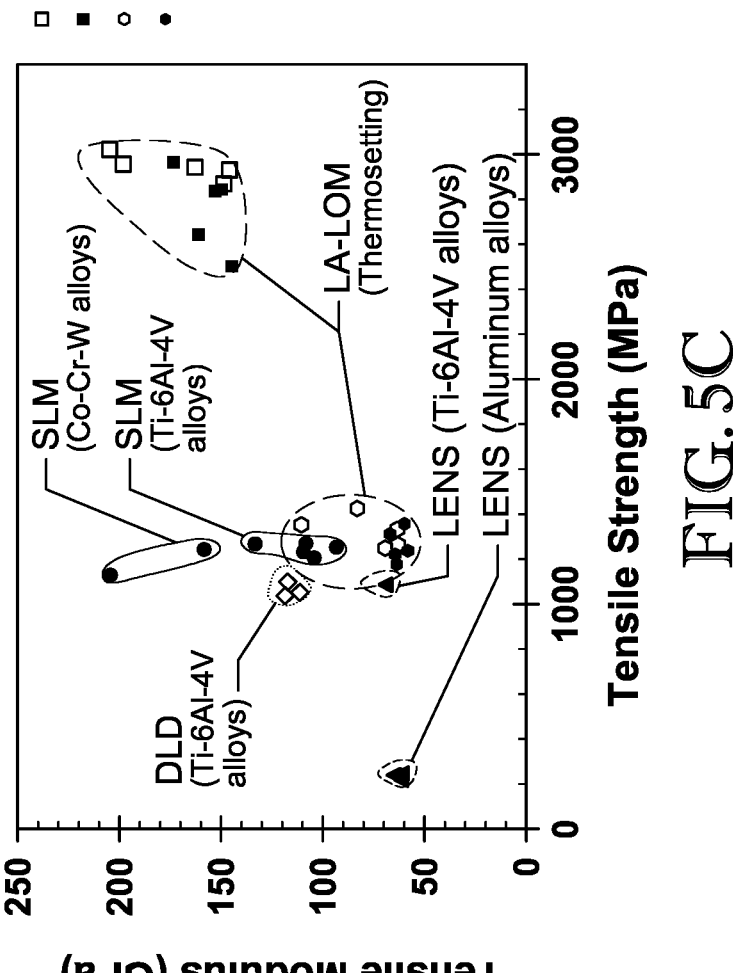

FIG. 5(c) also shows a tensile property map of tensile strength versus modulus for the 3D parts fabricated by the above described methods (e.g., LA-LOM method) and for the metallic materials fabricated by common AM methods, namely, selective laser melting (SLM), laser engineered net shaping (LENS) and direct laser deposition (DLD). The tensile property data of these metallic materials are summarized in Table 4.

TABLE 3

Mechanical properties of the LA-LOM-printed 3D parts and comparative with properties of metallic materials fabricated by additive manufacturing.

| Materials | Fabricating method | Tensile strength (MPa) | Flexural strength (MPa) |
|---|---|---|---|
| CCF/EP (this work) | LA-LOM | 2945 | 1309 |
| Ti-6Al-4V alloys | SLM | 1229 | |
| Ti-6Al-4V alloys | SLM | 1269 | |
| Ti-6Al-4V alloys | SLM | 1267 | |
| AlCrCuFeNi alloys | SLM | | 1655 |
| | | | 2052 |
| AlCoCuFeNi alloys | SLM | | 1471 |
| | | | 1600 |
| | | | 1292 |
| Ti-6Al-4V alloys | SLM | | 938 |
| | | | 826 |
| Ti-6Al-4V alloys | LENS | 1068 | |
| Ti-Nb alloys | LENS | | 762 |
| Ti-6Al-4V alloys | DLD | 1049 | |
| Ni-based alloys | DLD | | 986 |
| | | | 969 |
| | | | 1462 |

Abbreviations: CCF—continuous carbon fiber; EP—epoxy; SLM—selective laser melting; LENS—laser engineered net shaping; DLD—direct laser deposition.

The tensile properties of the multi-directional 3D parts are comparable to most metallic materials. Compared to the properties of these metallic materials, a significant improvement can be observed for the unidirectional 3D parts. Specifically, the strength values for the unidirectional 3D parts, ranging between 2500 and 3000 MPa, are noticeably better than the value of 1269 MIPa reported for the Ti-6Al-4V alloys fabricated by the SLM method.

Figure 6:
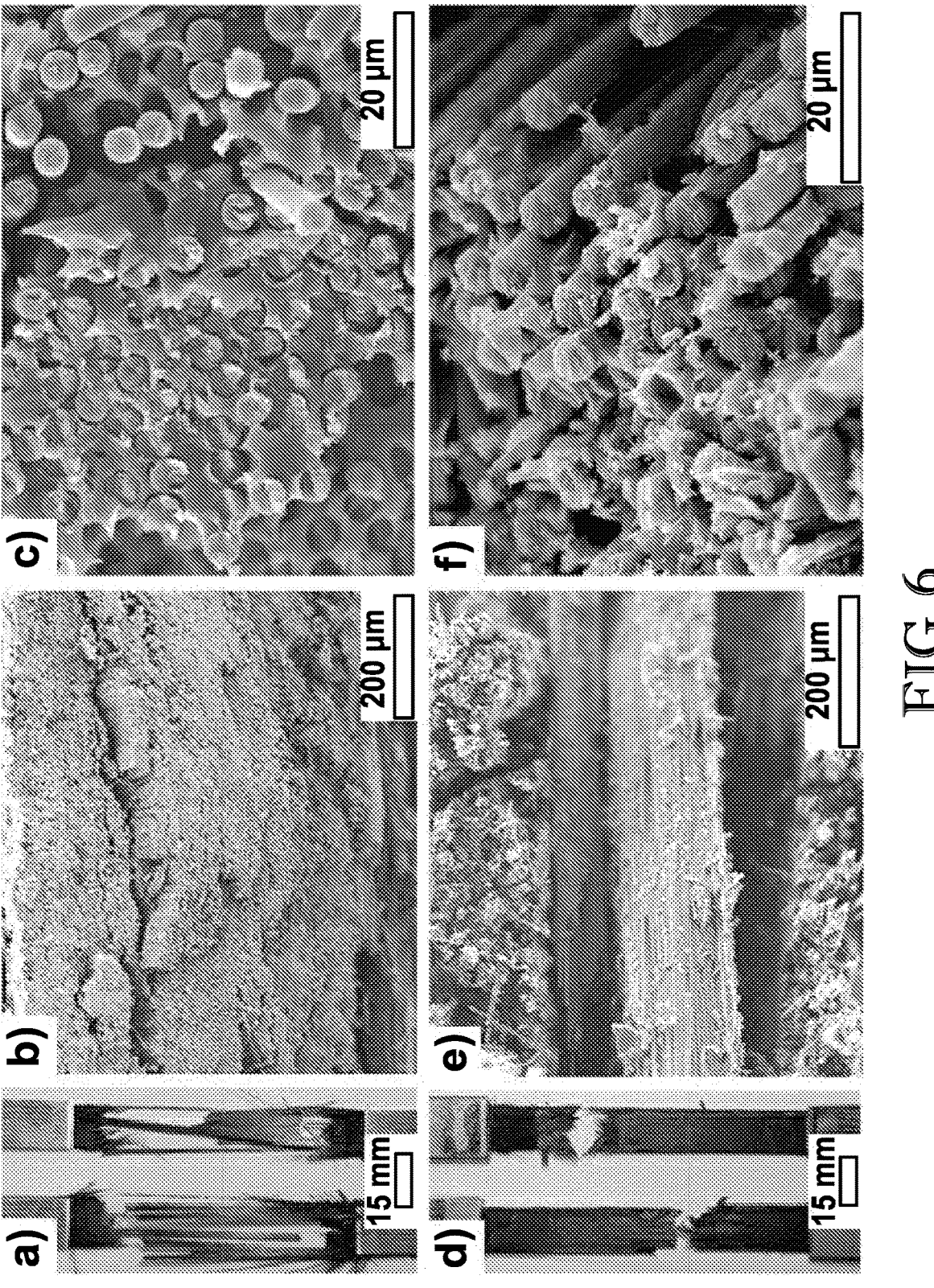
FIG. 6 depicts in images (a)-(f) the tensile fracture surfaces of the 3D parts without graphene fabricated using the system and process depicted in FIGS. 1 and 2.

FIG. 6 shows images of the tensile fracture surfaces of the 3D parts fabricated using the above described system and/or process. More particularly, FIG. 6 shows the tensile properties and behaviors of 3D parts fabricated using unidirectional ([0°]$_s$ fiber arrangements) and multi-directional ([0°/–45°/+45°]$_s$ fiber arrangements) continuous carbon pre-preg fibers, such as, e.g., 12029-D commercially available from Rock West Composites Corp., West Jordan, UT.

FIG. 6(a) shows an image of the tensile fracture surfaces of the unidirectional 3D parts without graphene, and FIGS. 6(b) and 6(c) show scanning electron microscopy (SEM) images of the tensile fracture surfaces of the unidirectional 3D parts without graphene. As best seen in FIG. 6(a), fiber pullout and breakage and the fiber matrix cavity are observed. However, as shown in FIG. 6(b) and FIG. 6(c), delamination, i.e., a mode of failure where a material fractures into layers, does not appear in the fracture surface of the unidirectional 3D parts, meaning that fiber breakage and fiber-matrix debonding are the main fracture reasons.

FIG. 6(d) shows an image of the tensile fracture surfaces of the multi-directional 3D parts without graphene, and FIGS. 6(e) and 6(f) show SEM images of the tensile fracture surfaces of the multi-directional 3D parts without graphene. FIG. 6(f) best shows that some fibers are completely pulled out, and FIG. 6(e) best shows that severe delamination occurs. These results demonstrate their tension failure mechanism consists of both pullout of fibers and delamination.

Figure 7:
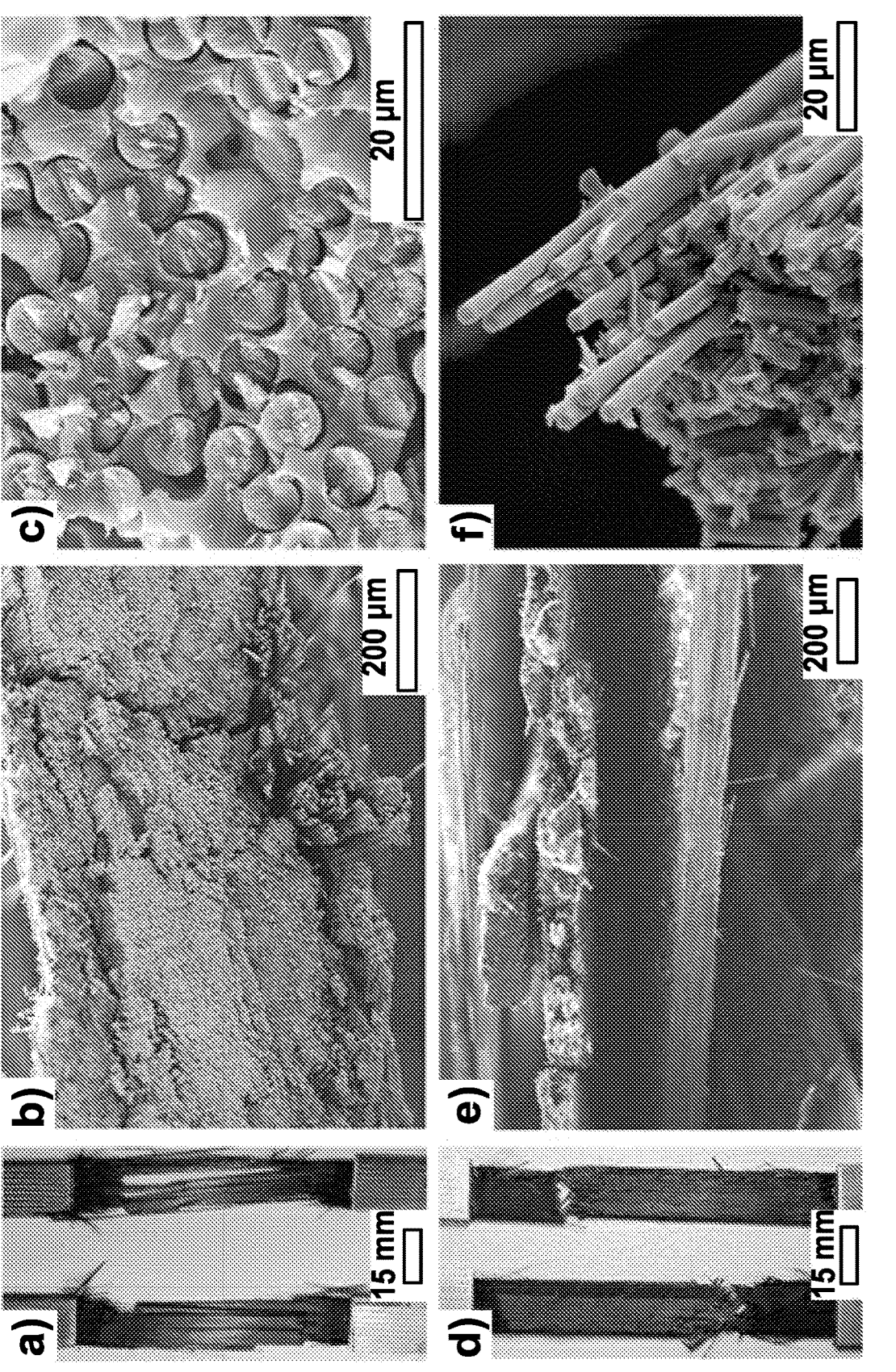
FIG. 7 depicts in images (a)-(f) of the tensile fracture surfaces of the 3D parts with graphene fabricated using the system and process depicted in FIGS. 1 and 2.

FIG. 7 shows images of the tensile fracture surfaces of the 3D parts fabricated using the above described system and/or process. More particularly, FIG. 7 shows the tensile fracture surfaces and behaviors of 3D parts fabricated using unidirectional ([0°]$_s$ fiber arrangements) and multi-directional ([0°/–45°/+45°]$_s$ fiber arrangements) continuous carbon pre-preg fibers, such as, e.g., 12029-D commercially available from Rock West Composites Corp., West Jordan, UT, impregnated with graphene.

FIG. 7(a) shows an image of the tensile fracture surfaces of the unidirectional 3D parts impregnated with graphene, and FIGS. 7(e) and 7(f) show SEM images of the tensile fracture surfaces of the unidirectional 3D parts impregnated with graphene. With respect to the multi-directional 3D parts with graphene, fiber pullout and delamination are observed due to a lower interfacial bonding strength, which illustrates that the load-carrying capacity of the is the multi-directional 3D parts with graphene is lower than the unidirectional 3D parts with graphene.

FIG. 8 shows the flexural properties of the 3D parts fabricated using the above described system and/or process. More particularly, FIG. 8 shows the flexural properties of 3D parts fabricated using unidirectional ([0°]$_s$ fiber arrangements) and multi-directional ([0°/–45°/+45°]$_s$ fiber arrangements) continuous carbon pre-preg fibers, such as, e.g., 12029-D commercially available from Rock West Composites Corp., West Jordan, UT, and unidirectional and multi-directional continuous carbon pre-preg fibers impregnated with graphene.

Figure 8A:
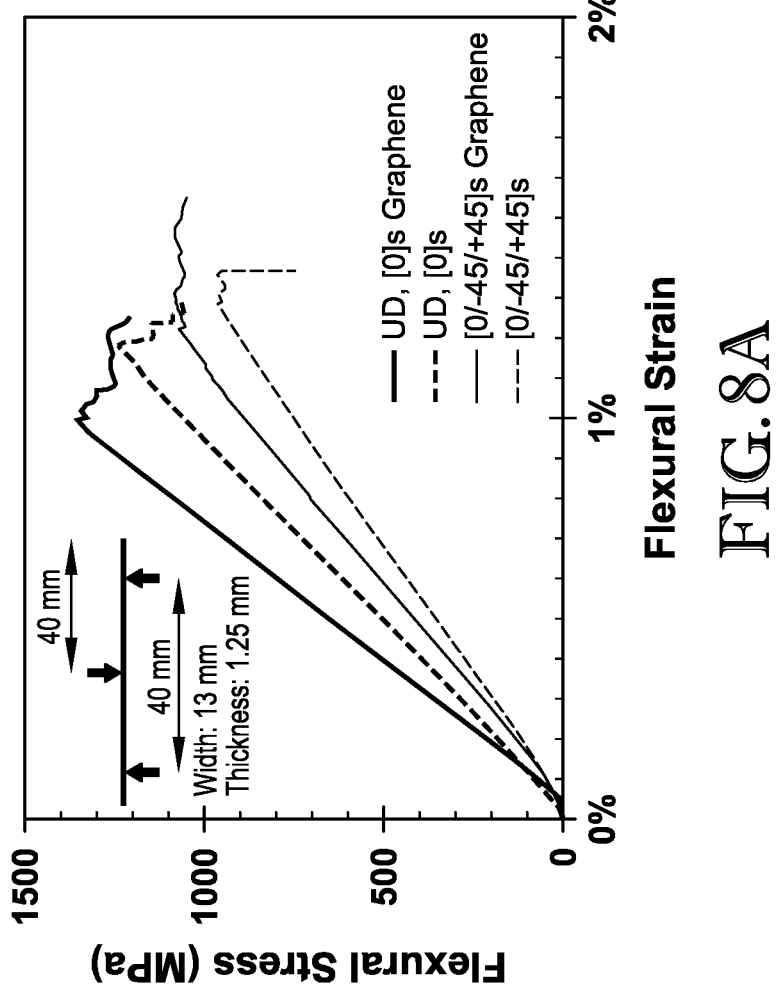
FIGS. 8A-8C depict the flexural properties of the 3D parts with and without graphene fabricated using the system and process depicted in FIGS. 1 and 2.

FIG. 8(a) shows the representative flexural stress-strain curves of the unidirectional and multi-directional 3D parts with or without graphene using a 3-point bending test. As can be seen in FIG. 8(a), the unidirectional 3D parts with graphene display the highest flexural strength and modulus, ~1310 MPa and ~140 GPa, respectively. The multi-directional 3D parts with graphene exhibit a lower flexural strength and modulus of ~1020 MPa and ~90 GPa, respectively, due to less carbon fibers along the bending direction. With the enhancement of graphene at the interface, the flexural strength and modulus of the unidirectional 3D parts improved by 10% and 27%, respectively. For the multi-directional 3D samples, the increased rate of flexural strength and modulus is 9% and 13%, respectively. Table 4 shows the average flexural strength, modulus, and standard deviation of the unidirectional and multi-directional 3D parts with or without graphene.

TABLE 4

Flexural strength and modulus of the LA-LOM-printed 3D parts.

| Samples | Flexural Strength (MPa) | Standard Deviation (MPa) | Flexural Modulus (GPa) | Standard Deviation (GPa) |
|---|---|---|---|---|
| [0°]s without graphene | 1190 | 70 | 110 | 7 |
| [0°]s with graphene | 1310 | 50 | 140 | 15 |
| [0°/45°/0°/–45°]s without graphene | 940 | 40 | 80 | 4 |
| [0°/45°/0°/–45°]s with graphene | 1020 | 60 | 90 | 5 | and FIGS. 7(b) and 7(c) show SEM images of the tensile fracture surfaces of the unidirectional 3D parts impregnated with graphene. With respect to the unidirectional 3D parts with graphene, only a few fibers are pulled out, and no crack occurred in the matrix, meaning that the load-carrying capacity is improved after enhancing interlaminar bonding strength with graphene. The interfacial strength would affect the properties of the printed composites. A crack initiates in the matrix due to a composite's lower strength when compared to carbon fibers. The matrix around the crack will then yield, resulting in fiber-matrix debonding. The added graphene could prevent crack extension and enhance the load-carrying capacity of the matrix, facilitating higher strength and low deformation in the unidirectional 3D parts with graphene.

Figure 8B:
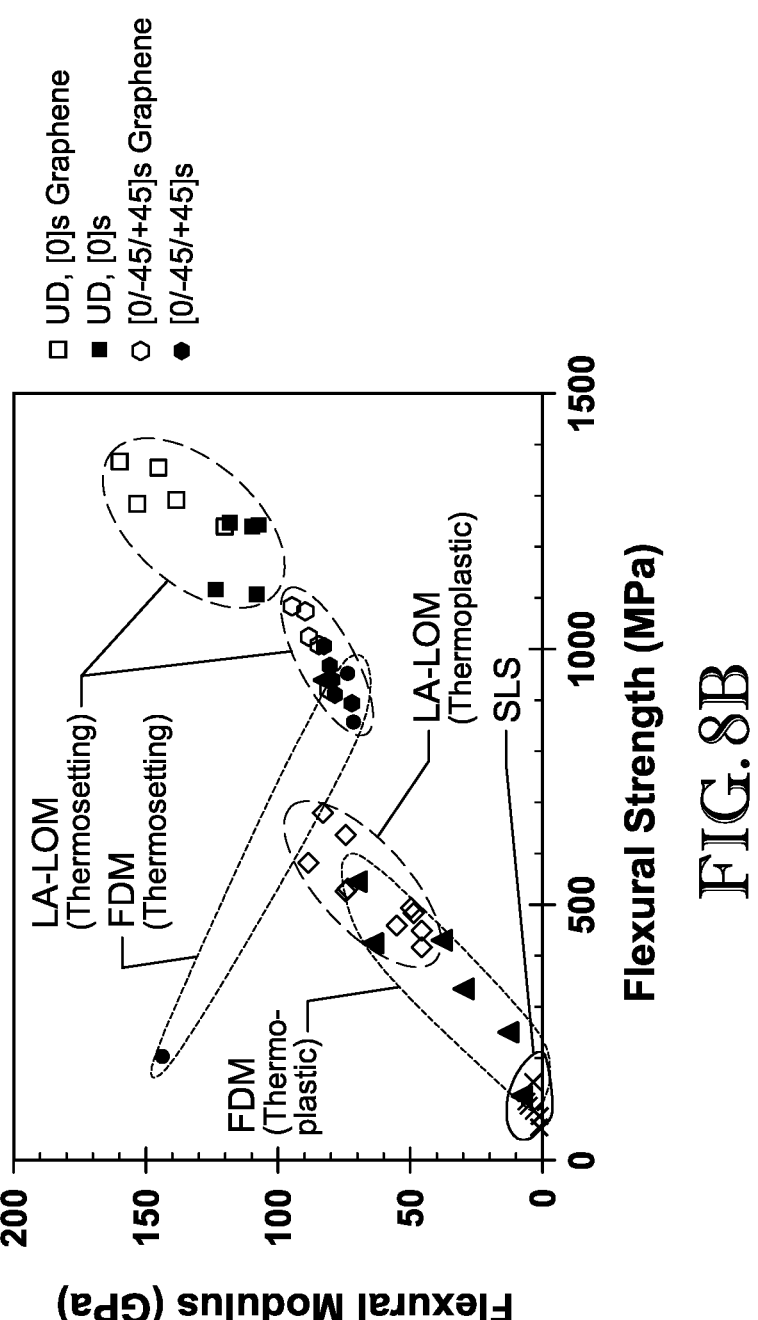

FIG. 7(d) shows an image of the tensile fracture surfaces of the unidirectional 3D parts impregnated with graphene, FIG. 8(b) shows a flexural property map of flexural strength versus modulus for the 3D parts fabricated by the above described methods and for the carbon fiber composites fabricated by common AM methods, namely, FFF, and SLA. The flexural properties of these composites are summarized in Table 2 (shown above). The 3D parts have impressive flexural properties in terms of flexural strength and modulus. Specifically, with respect to the unidirectional 3D parts with graphene, these 3D parts are 37-550% stronger and 14-120% stiffer than the FDM thermosetting composites with continuous carbon fibers reinforcement, and up to three to ten times stronger than SLS and FDM (thermoplastic, CCF). These results show that the flexural performance of the 3D parts is superior to that of 3D printed thermoplastic composites and thermosetting composites fabricated by other AM methods. The superior flexural properties are due to the better interfacial bonding caused by the full consolidation of laminated prepregs and graphene enhancement. Thus, when added, the 3D parts with graphene can be used to fabricate CFRPC materials suitable for industries needing rigid and stiff materials.

Figure 8C:
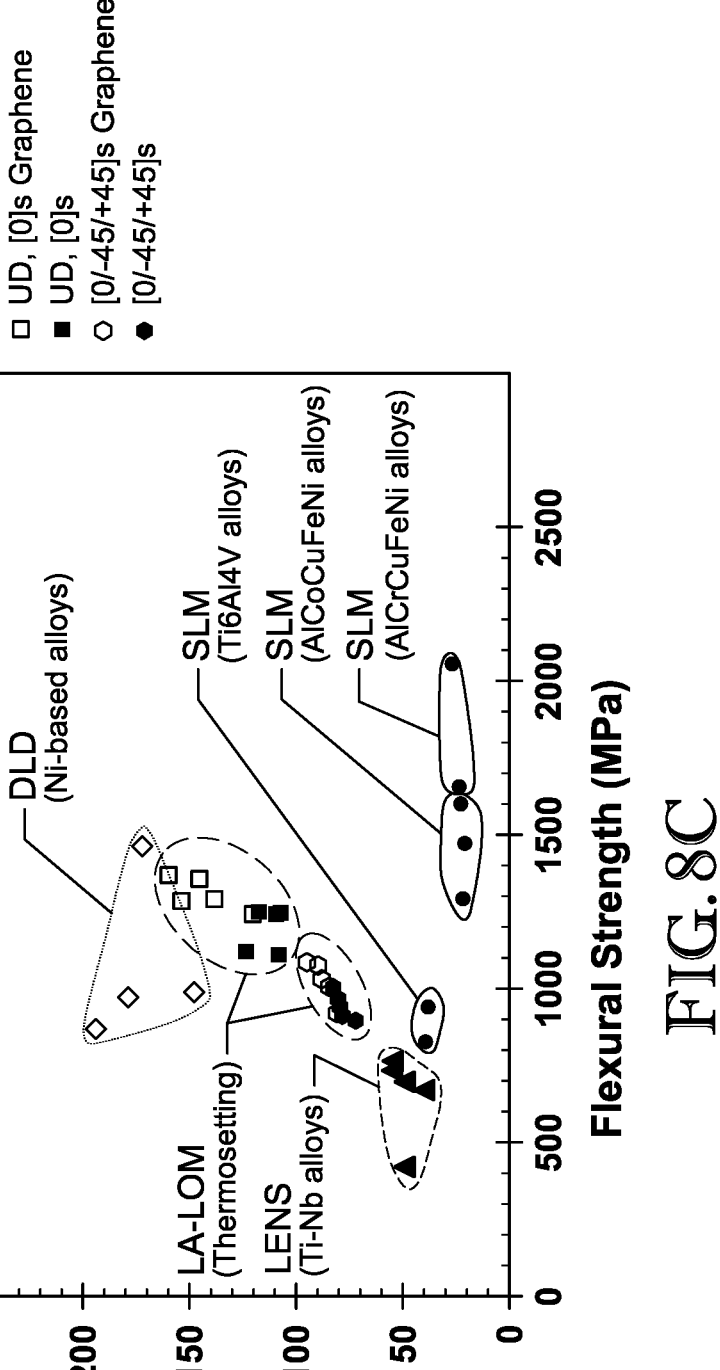

FIG. 8(c) shows a flexural property map of flexural strength versus modulus for the 3D parts fabricated by the above described methods and for the metallic materials fabricated by common AM methods, namely, selective laser melting (SLM), laser engineered net shaping (LENS) and direct laser deposition (DLD). The flexural property data of these metallic materials are summarized in Table 3 (shown above). As shown in FIG. 8(c), the 3D parts can reach or even exceed the flexural modulus of the majority of the presented metallic materials. The flexural strength of Ni-based alloys produced by DLD is in the range of the 3D parts with substantially higher modulus. The AlCrCuFeNi alloys produced by SLM exhibit good flexural strength, ranging between 1700 and 2100 MPa. In brief, the flexural properties of the 3D parts can be comparable to some metallic materials fabricated by common metal AM processes.

We claim:

1. A three-dimensional, continuous-fiber reinforced composite part comprising:
a laminate structure made of a plurality of layers of continuous-fiber reinforced sheets, each of the plurality of layers of continuous-fiber reinforced sheets having two opposed faces and comprising a fiber and epoxy resin material composite and graphene or a graphene derivative,
wherein a first layer of continuous-fiber reinforced sheet is welded to at least one other layer of continuous-fiber reinforced sheet so that the epoxy resin material of a first face of the first layer of continuous-fiber reinforced sheet is intermixed with the epoxy resin material of a first face of each of the at least one other continuous-fiber reinforced sheets so as to form an interlayer bond between the first layer of continuous-fiber reinforced sheet and the at least one other layer of continuous-fiber reinforced sheet that occupies at least a majority of the first face of the first layer of continuous-fiber reinforced sheet, and wherein an interstitial space is formed between the second face of the first continuous-fiber reinforced sheet and the first face of the second continuous-fiber reinforced sheet, wherein the interstitial space comprises a portion of the resin material and a portion of the graphene or graphene derivative from each of the at least first and second continuous-fiber reinforced sheets.

2. The three-dimensional, continuous-fiber reinforced composite part of claim 1, wherein the laminate structure has a tensile strength that is at least as great as each of the layer of continuous-fiber reinforced sheets, and wherein the interlayer bond has a lap shear strength that is at least 14 MPa.

3. The three-dimensional, continuous-fiber reinforced composite part of claim 1, wherein the fiber component of the fiber and epoxy resin material composite comprises carbon fibers and/or glass fibers.

4. The three-dimensional, continuous-fiber reinforced composite part of claim 1, wherein the fiber component of the fiber and epoxy resin material composite comprises unidirectional and/or multi-directional fibers.

5. The three-dimensional, continuous-fiber reinforced composite part of claim 1, wherein each of the plurality of layers of continuous-fiber reinforced sheets is a fiber-epoxy prepreg.

6. The three-dimensional, continuous-fiber reinforced composite part of claim 5, wherein the prepreg is loaded with the graphene or graphene derivative.

7. A method for forming a three-dimensional, continuous-fiber reinforced composite part comprising:
forming a laminate structure comprising a first layer of continuous-fiber reinforced sheet welded to at least one other layer of continuous-fiber reinforced sheet, wherein each of the layers of continuous-fiber reinforced sheets having two opposed faces and comprising a fiber and epoxy resin material composite and graphene or a graphene derivative,
wherein the welding of the first layer of continuous-fiber reinforced sheet to the at least one other layer of continuous-fiber reinforced sheet comprises causing the epoxy resin material of a first face of the first layer of continuous-fiber reinforced sheet to heat and intermix with the epoxy resin material of a first face of each of the at least one other continuous-fiber reinforced sheets so as to form an interlayer bond between the first layer of continuous-fiber reinforced sheet and the at least one other layer of continuous-fiber reinforced sheet that occupies at least a majority of the first face of the first layer of continuous-fiber reinforced sheet thereby forming the laminate structure and wherein the welding forms an interstitial space between the second face of the first continuous-fiber reinforced sheet and the first face of the second continuous-fiber reinforced sheet, wherein the interstitial space comprises a portion of the resin material and a portion of the graphene or graphene derivative from each of the at least first and second continuous-fiber reinforced sheets.

8. The method of claim 7, wherein the fiber component of the fiber and epoxy resin material composite comprises carbon fibers and/or glass fibers.

9. The method of claim 7, wherein the fiber component of the fiber and epoxy resin material composite comprises unidirectional and/or multi-directional fibers.

10. The method of claim 7, wherein each of the plurality of layers of continuous-fiber reinforced sheets is a fiber-epoxy prepreg.

11. The method of claim 10, wherein the prepreg is loaded with the graphene or graphene derivative.

12. The method of claim 11, wherein loading includes applying a graphene-containing dispersion to the continuous-fiber reinforced sheets.

13. A method for forming a three-dimensional, continuous-fiber reinforced composite part comprising:
providing at least first and second continuous-fiber reinforced sheets wherein each of the continuous-fiber reinforced sheets has first and second opposed faces and wherein each of the continuous-fiber reinforced sheets further comprise a fiber and resin material composite and graphene or a graphene derivative;
placing the first sheet on top of the second sheet so that the second face of the first sheet abuts the first face of the second sheet; and
applying a laser beam to the first face of the first sheet to create a weld between the second face of the first sheet first and the first face of the second sheet thereby forming a laminate structure wherein the weld comprises an interstitial space between the second face of the first continuous-fiber reinforced sheet and the first face of the second continuous-fiber reinforced sheet, wherein the interstitial space comprises a portion of the resin material and a portion of the graphene or graphene derivative from each of the at least first and second continuous-fiber reinforced sheets.

14. The method of claim 13, further comprising cutting one or more 2D desired shapes in the first and second continuous-fiber reinforced sheets prior to the placing step, and further comprising compacting the first face of the first continuous-fiber reinforced sheet.

15. The method of claim 13, wherein the laser is a carbon dioxide laser, and wherein the carbon dioxide laser is operated at a power between 25W and 95W.

16. The method of claim 13, further comprising heating the laminate structure after applying the laser beam, wherein the heating is performed at about 100° C. to about 200° C. for about 1 minute to about 1000 minutes.

\* \* \* \* \*